Patented Aug. 8, 1944

2,355,141

UNITED STATES PATENT OFFICE 2,355,141

N-ACYL-N-ALKANOL AROMATIC AMINES

Albert B. Boese, Jr., Charleston, W. Va., assignor to Carbide and Carbon Chemicals Corporation, a corporation of New York No Drawing. Application September 6, 1941, Serial No. 409,781

11 Claims. (Cl. 260—562)

This invention relates to new chemical compounds of the N-acyl-N-alkanol aromatic amine type and to a process for their production. These new compounds are useful as dyestuff intermediates and as starting materials in organic syntheses.

It is known that a mono-, di-, or trialkanol amine reacts with a fatty acid, fatty acid chloride or anhydride, or an ester of a fatty acid at relatively high temperatures and that this reaction results in a produce which is a mixture of various compounds. The temperatures employed are substantially above 100° C., even at subatmospheric pressures. These reactions have met with some degree of successful commercial application where a reaction product consisting of a mixture of various compounds is not undesirable, but, so far as I am aware, it is impossible, by a process employing any reactions and conditions heretofore proposed, to prepare an N-acyl-N-alkanol aryl amine.

Attempts to obtain N-acyl-N-alkanol aryl amines by the condensation of N-aryl alkanolamines with aliphatic acids or aliphatic acid esters, anhydrides, chlorides, and the like have been unsuccessful. For instance, attempts to prepare N-acetyl-N-ethanol phenyl amine by condensing N-ethanol phenyl amine with either acetic acid or with acetic anhydride have resulted in the formation of beta-anilino-ethyl acetate.

I have found that N-acyl-N-alkanol aromatic amines in which the acyl group corresponds to that of the lower aliphatic acids can be prepared in good yields, substantially free of the isomeric substituted alkanol ester, from ketenes and N-alkanol aryl amines (anilino-alkanols). I have found that under certain conditions a ketene, including compounds of the general type

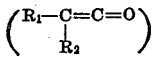

where $R_1$ and $R_2$ each represent one of the group: hydrogen, alkyl, aryl, substituted alkyl or substituted aryl radicals, will add to an N-alkanol aromatic secondary amine and form the corresponding N-acyl-N-alkanol aromatic amine in good yields. Among the ketenes which may be used are ketene, methyl ketene, dimethyl ketene, ethyl ketene, methyl ethyl ketene, diethyl ketene, phenyl ketene, diphenyl ketene, and the like. These ketenes may be condensed with various N-alkanolamines such as N-isopropanol phenyl amine, N-ethonal phenyl amine, N-methanol phenyl amine, N-butanol phenyl amine, N-isopentanol phenyl amine, N-ethanol tolyl amine, N-ethanol naphthyl amine, N-ethanol nitro-phenyl amine, N-ethanol p-ethyl-phenyl amine, and the like. The products obtained thereby are substantially free of any of the isomeric substituted alkanol esters despite the general tendency of ketenes to acylate hydroxyl groups. To obtain such an ester free product, however, the reaction must be conducted at temperatures not substantially in excess of 100° C. The reaction is also conducted preferably in the presence of an inert diluent or dispersing medium which may be a solvent for the reactants and which is easily separable from the reaction product.

I have found that N-acyl-N-alkanol aromatic amines in which the acyl radical corresponds to that of the lower aliphatic acids undergo transformation under certain conditions to the isomeric substituted alkanol ester. For example, N-acetyl-N-ethanol phenyl amine when subjected to temperatures above 100° C. undergoes transformation to beta-anilino-ethyl acetate.

According to my invention, the N-alkanol aromatic secondary amines may be dissolved in an inert solvent and allowed to react with a ketene during and after intimate mixing at a temperature not substantially above 100° C., and preferably not above 80° C. After completion of the reaction, that is, the addition of the ketene to the secondary amine, the reaction mass may be subjected to a purification as follows. Where substances which have a lower boiling point than the desired product may be present, a preferred method of purification is to subject the reaction mass to a stripping treatment at subatmospheric pressures and at temperatures not substantially above 80° C. to volatilize such volatile materials therefrom. This generally results in an oily liquid residue which solidifies on standing. This residue product is generally of sufficient purity for ordinary uses. Where a more highly purified product is desired it can be obtained by trituration of the residue in the presence of cold diethyl ether followed by washing with cold diethyl ether.

EXAMPLE 1

*N-acetyl-N-ethanol phenyl amine*

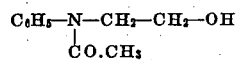

Two hundred fifty grams of N-ethanol phenyl amine were dissolved in 300 cc. of benzene in a closed vessel and gaseous ketene was admitted through a gas inlet while the reaction mixture was vigorously stirred and cooled so that the temperature was maintained at about 35° C. After 77 grams of ketene had been absorbed, the reaction mass was subjected to treatment at temperatures up to but not above 70° C. and at reduced pressures as low as 200 to 300 mm. of mercury, absolute, to strip therefrom lower boiling materials. Three hundred twenty-six grams of residue were thus obtained as a pale yellow oil which solidified on standing. This solidified mass was then triturated in the presence of a small amount of cold diethyl ether and washed with 400 cc. of cold diethyl ether. After removal of the ether, 237 grams of pure, crystalline N-acetyl-N-ethanol phenyl amine were obtained. This corresponds to a yield of 76 per cent of the theoretical.

N-acetyl-N-ethanol phenyl amine was found to be a colorless crystalline compound which melts at between 62° C. and 63° C. It is soluble in water, alcohols, ketones, esters, chlorinated hydrocarbons and aromatic hydrocarbons; and is only sparingly soluble in ethers and aliphatic hydrocarbons.

EXAMPLE 2

*N-acetyl-N-isopropanol phenyl amine*

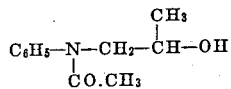

Eigthy-three grams of N-isopropanol phenyl amine were dissolved in 200 cc. of benzene in a closed vessel and gaseous ketene was admitted through a gas inlet, while the reaction mixture was vigorously stirred and cooled so that the temperature was maintained at about 35° C. After 23 grams of ketene had been absorbed, the reaction mass was subjected to treatment at temperatures up to but not above 70° C. and at reduced pressures as low as 200 to 300 mm. of mercury, absolute, to strip therefrom lower boiling materials. One hundred six grams of residue were thus obtained as a pale yellow oil which solidified on standing. After a further purification treatment similar to that in Example 1, 77 grams of pure, crystalline N-acetyl-N-isopropanol phenyl amine were obtained. This corresponds to a yield of 70 per cent of the theoretical.

N-acetyl-N-isopropanol phenyl amine was found to be a colorless crystalline solid which melts between 77° C. and 78° C. It is soluble in water, alcohols, ketones, esters, chlorinated hydrocarbons, and aromatic hydrocarbons, and is sparingly soluble in ethers and aliphatic hydrocarbons.

It is to be understood that these examples are submitted for illustrative purposes only and that variations of them which will be apparent to those skilled in the art may be made without departing from the spirit of this invention.

I claim:

1. A process for making a N-acetyl-N-alkanol aromatic amine which comprises forming a reaction mixture containing a N-alkanol aromatic secondary amine and ketene dispersed in an inert diluent and permitting the ketene and secondary amine to react at a temperature below 80° C., said ketene and said secondary amine being employed in approximately stoichiometrical amounts, and controlling the temperature of the reaction mixture and so maintaining the reaction mixture below said temperature during the reaction that the reaction of the ketene with the secondary amine takes place substantially exclusively at the =NH group thereof.

2. A process for making a N-acetyl-N-alkanol aromatic amine which comprises forming a reaction mixture containing a N-alkanol aromatic secondary amine and ketene dispersed in an inert diluent and permitting the ketene and secondary amine to react at a temperature below 80° C., said ketene and said secondary amine being employed in approximately stoichiometrical amounts, and controlling the temperature of the reaction mixture and so maintaining the reaction mixture below said temperature during the reaction that the reaction of the ketene with the secondary amine takes place substantially exclusively at the =NH group thereof; and thereafter recovering the resultant N-acetyl-N-alkanol aromatic amine at a temperature below 80° C. to avoid isomerization to the isomeric N-alkanol ester.

3. A process for making a N-acetyl-N-ethanol aromatic amine which comprises forming a reaction mixture containing a N-ethanol aromatic secondary amine and ketene dispersed in an inert diluent and permitting the ketene and the secondary amine to react at a temperature below 80° C., said amine and said secondary amine being employed in substantially stoichiometrical amounts, and controlling the temperature of the reaction mixture and so maintaining the reaction mixture below said temperature during the reaction that the reaction of the ketene with the secondary amine takes place substantially exclusively at the =NH group thereof.

4. A process for making N-acetyl-N-ethanol phenyl amine which comprises forming a reaction mixture containing N-ethanol phenyl secondary amine and ketene dispersed in an inert diluent and permitting the ketene and the secondary amine to react at a temperature below 80° C., said amine and said secondary amine being employed in substantially stoichiometrical amounts, and controlling the temperature of the reaction mixture and so maintaining the reaction mixture below said temperature during the reaction that the reaction of the ketene with the secondary amine takes place substantially exclusively at the =NH group thereof.

5. A process for making a N-acetyl-N-isopropanol aromatic amine which comprises forming a reaction mixture containing a N-isopropanol aromatic secondary amine and ketene dispersed in an inert diluent and permitting the ketene and secondary amine to react at a temperature below 80° C., said ketene and said secondary amine being employed in approximately stoichiometrical amounts, and controlling the temperature of the reaction mixture and so maintaining the reaction mixture below said temperature during the reaction that the reaction of the ketene with the secondary amine takes place substantially exclusively at the =NH group thereof.

6. A process for making N-acetyl-N-isopropanol phenyl amine which comprises forming a reaction mixture containing N-isopropanol phenyl secondary amine and ketene dispersed in an inert diluent and permitting the ketene and the secondary amine to react at a temperature below 80° C., said amine and said secondary amine being employed in substantially stoichiometrical amounts, and controlling the temperature of the reaction mixture and so maintaining the reaction mixture below said temperature during the reaction that the reaction of the ketene with the secondary amine takes place substantially exclusively at the =NH group thereof.

7. A process for making a N-acetyl-N-alkanol aromatic amine which comprises passing ketene in the vapor state into a solution of a N-alkanol aromatic secondary amine in an inert diluent and permitting the ketene to react with said secondary amine at a temperature of about 35° C., said ketene and said secondary amine being employed in substantially stoichiometrical amounts, and controlling the temperature of the reaction mixture and so maintaining the reaction mixture at said temperature during the reaction that the reaction of the ketene with the secondary amine takes place substantially exclusively at the =NH group thereof.

8. A process for making a N-acetyl-N-alkanol phenyl amine which comprises passing ketene in the vapor state into a solution of a N-alkanol phenyl secondary amine in an inert diluent and permitting the ketene to react with said secondary amine at a temperature of about 35° C., said ketene and said secondary amine being employed in substantially stoichiometrical amounts and the alkanol group of said secondary amine having from 2 to 3 carbons atoms, and controlling the temperature of the reaction mixture and so maintaining the reaction mixtures at such temperature during the reaction that the reaction of the ketene with the secondary amine takes place substantially exclusively at the =NH group thereof.

9. As new chemical compounds, N-acetyl-N-alkanol aromatic amines.

10. As a new chemical compound, N-acetyl-N-ethanol phenyl amine.

11. As a new chemical compound, N-acetyl-N-isopropanol phenyl amine.

ALBERT B. BOESE, Jr.